May 2, 1967  C. A. BEURTHERET  3,317,857
ALTERNATING CURRENT GENERATOR HAVING A PHASE
SHIFTING FEEDBACK CIRCUIT
Filed March 23, 1964  3 Sheets-Sheet 1

Inventor
Charles Alphonse Beurtheret
by Michael J. Striker
Atty

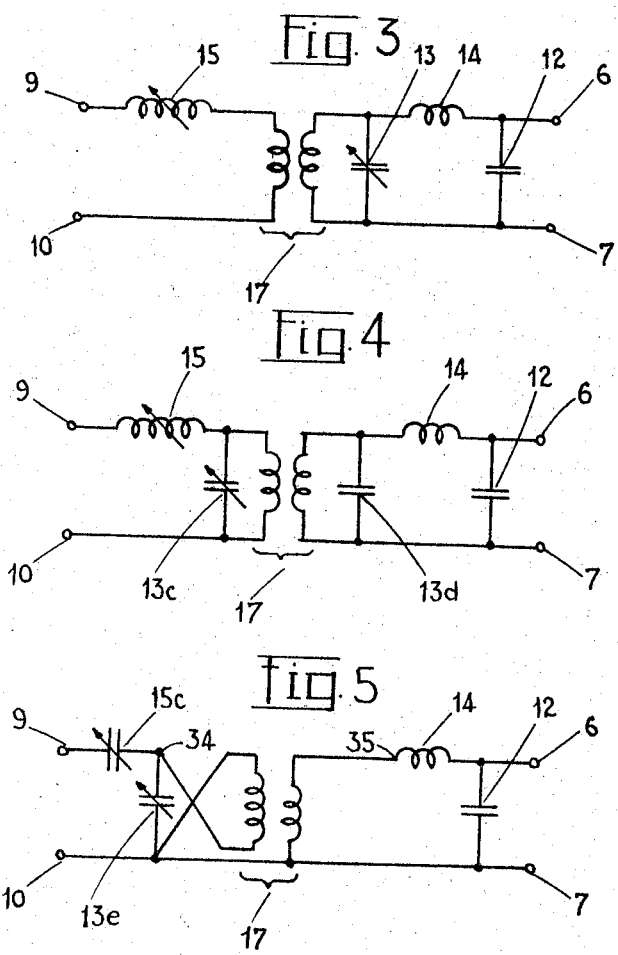

May 2, 1967  C. A. BEURTHERET  3,317,857
ALTERNATING CURRENT GENERATOR HAVING A PHASE
SHIFTING FEEDBACK CIRCUIT
Filed March 23, 1964  3 Sheets-Sheet 3
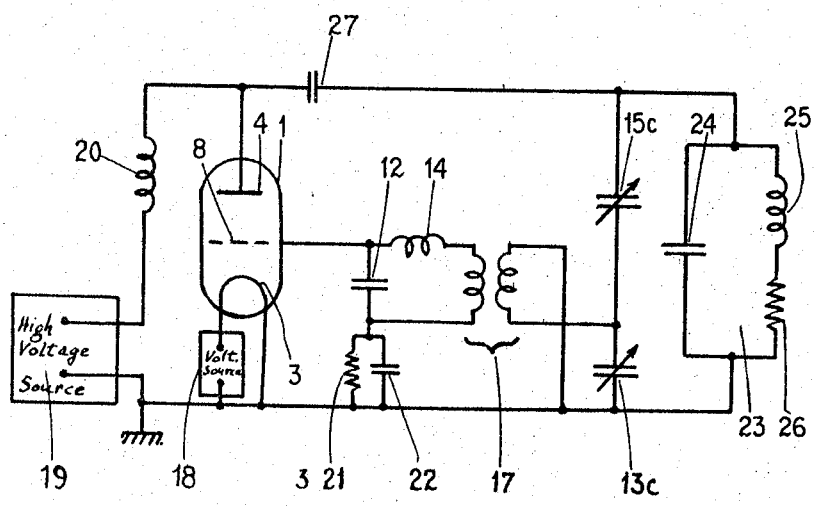
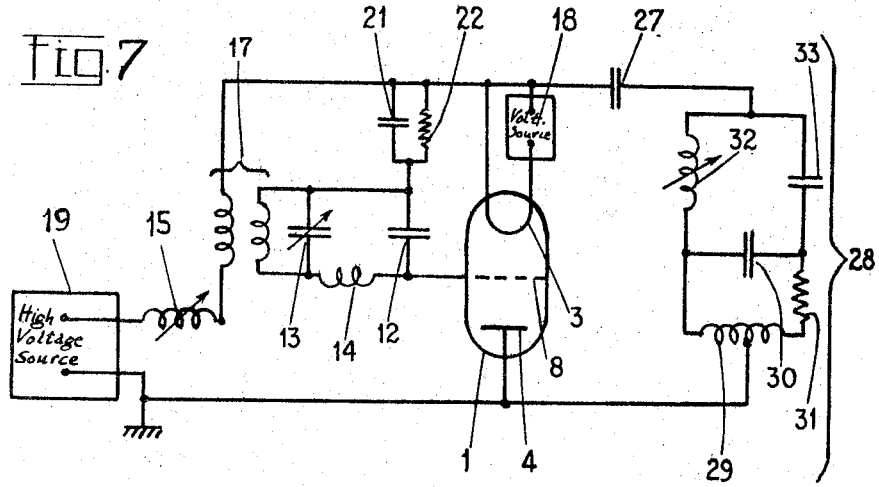
Inventor
Charles Alphonse Beurtheret
by Michael J. Striker

United States Patent Office 3,317,857
Patented May 2, 1967

3,317,857
ALTERNATING CURRENT GENERATOR HAVING A PHASE SHIFTING FEEDBACK CIRCUIT
Charles Alphonse Beurtheret, Saint-Germain-en-Laye, France, assignor to Compagnie Francaise Thomson-Houston, Paris, France
Filed Mar. 23, 1964, Ser. No. 353,777
Claims priority, application France, Mar. 26, 1963, 929,244
13 Claims. (Cl. 331—170)

This invention relates to alternating current generators in which an electronic tube connected to an oscillating circuit is caused to self-oscillate by means of a feedback or reaction circuit. These generators are suitable for operation both at high frequencies and at musical frequencies, preferably at frequencies between 3 kc. and 3 mc.

It is known that alternating current generators of the above specified type operate at maximum efficiency when the frequency of oscillation coincides with the resonance frequency of the oscillating circuit and the oscillating grid-cathode voltage is exactly in phase opposition with respect to the anode-cathode voltage. In the following description, the voltage of the grid with respect to the cathode will be known as the control voltage both in the case of grid drive operation, and in the case of cathode drive operation. According to this definition in both cases the optimum phase shift between the control voltage and the anode voltage is $\pi$ radians.

In power oscillators as known at present, it has been found that the actual operating conditions do not conform to the ideal conditions and that there exists a residual phase shift between the control voltage and the anode voltage which varies with the power and brings with it a notable decrease in the anode efficiency of the oscillator. This phenomenon occurs by reason of the nature of the feedback circuits used in these generators. Two types of circuit have essentially been used. In the first type the feedback voltage is taken from a voltage divider which may be either capacitive or inductive and which forms part of the anode circuit. In the second type a resonance circuit magnetically connected to the output circuit is connected to the input terminals of the tube.

The first of these types of circuit has the advantage that the relation between the control voltage and the anode voltage is almost independent of the operating frequency and of the input resistance of the tube, which thus allows operation of the generator with variable loads. However the required phase opposition of the two voltages is only obtained for an infinitely great input resistance. For any finite value of this resistance the phase shift is less than $\pi$.

The circuits of the second type theoretically allow for the obtaining of a phase shift of $\pi$ for a finite value of the input resistance, but this assumes that the resonant circuit of the grid is mistuned by a critical amount with respect to the anode circuit. Thus any variation of oscillation frequency or of input resistance of the tube brings about a considerable shift in the reaction phase from the value of $\pi$.

A particular difficulty occurs in oscillators where the output circuit is constituted by an assembly of over-coupled circuits and consequently has more than one single resonance frequency. In order to select one of these frequencies as the operational frequency, it is necessary that the reaction circuit be selective. This is the case when the reaction circuit comprises a resonance circuit, but given its insufficiency in operation with variable loads, one is led to use the circuit based upon a voltage divider which allows for excitation on each of the resonance frequencies of the output circuit.

It is one object of this invention to provide for an alternating voltage generator arrangement in which the optimum phase of the reaction voltage is obtained.

It is another object of the invention to provide for a generator arrangement as stated above which is free of the inconveniences characteristic of known generators.

The present invention has as a further object to provide for an alternating voltage generator in which the optimum phase shift between the control voltage and the anode voltage may be obtained independently of the load of the excitation circuit.

With the above objects in mind the invention includes in an atlernating current generator arrangement, an electronic amplifier tube having input and output terminals and a resonant output circuit having a first and second connecting terminal. A feedback circuit for rendering the resonant output circuit self-oscillating is connected between said tube input terminals and said connecting terminals of said output circuit. The feedback circuit is a four-terminal network having two first terminals connected with said tube input terminals and two second terminals connected with said connecting terminals, respectively, and including at least, starting from its side connected to said tube terminals, a first parallel reactance means arranged across said first terminals and at least partly replaceable by the input reactance of said tube. A first series reactance means is connected between one of said first and one of said second terminals. A second parallel reactance means is provided. The first and second parallel reactance means and the first series reactance means differ in absolute value by not more than a factor of 2 from one another. A second series reactance means is connected in series with said first series reactance means between said one first and said one second terminals. The second series reactance means has an absolute value which is a multiple of that of said first series reactance means, and has a polarity such that, taking into account its mode of connection with the rest of said four-terminal network, said second series reactance means appears as an inductive reactance as seen from the side of the amplifier tube provided that said amplifier tube is arranged for grid drive operation, while having a polarity opposite to that of said first series reactance means provided that said amplifier tube is arranged for cathode drive operation.

In the case where the generator is a grid drive arrangement, the second series reactance, taking into account its mode of connection with the rest of the four-terminal network, must appear, as seen from the tube side, as of the same sign as the first series reactance. In the case of cathode drive arrangement it must appear as of the opposite sign.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 3 is a circuit diagram of a feedback circuit that may form part of the arrangements of FIGS. 1 or 2;

FIG. 4 is a circuit diagram of another feedback circuit that may form part of the arrangement of FIGS. 1 or 2;

FIG. 5 is a circuit diagram of still another feedback circuit that may be incorporated in the arrangements of FIGS. 1 or 2;

FIG. 6 is a complete circuit diagram of one embodiment of a generator arrangement according to the invention; and FIG. 7 is a complete circuit diagram of another embodiment of a generator arrangement according to the invention.

Figure 1:
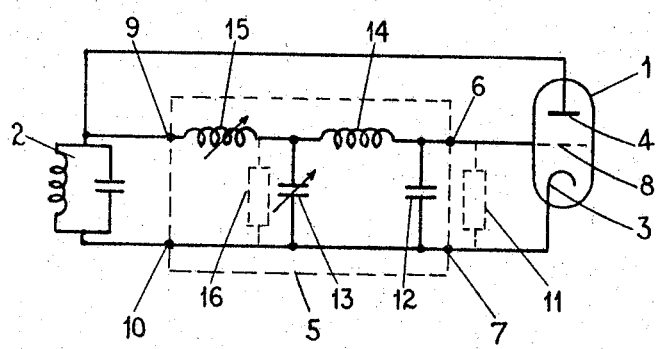
FIG. 1 is a schematic overall circuit diagram of a generator arrangement according to the invention which incorporates grid drive.
Figure 2:
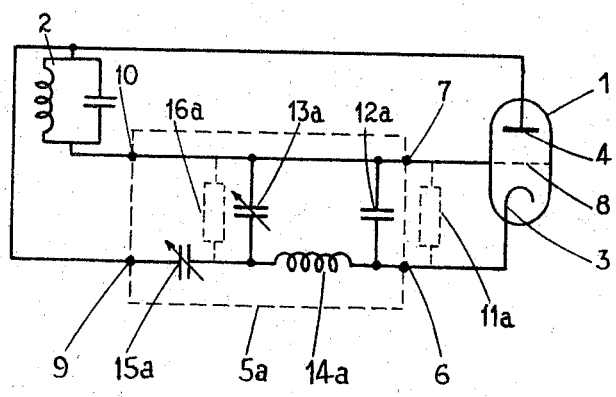
FIG. 2 is a schematic overall circuit diagram of a generator arrangement according to the invention which incorporates cathode drive.

The diagrams of FIGS. 1 and 2 serve to illustrate the principal characteristics of the invention. They do not therefore contain the auxiliary elements such as the direct current supply and blocking capacitors. These elements, the locations of which do not fall within the scope of the invention, are shown in FIGS. 6 and 7 in relation to embodiments of the invention.

FIG. 1 shows the diagram of a generator according to the invention in the case of a grid drive arrangement. The components are an electronic tube 1, for example a triode, a resonant output circuit 2, for example consisting of a capacitor and an inductance in parallel and finally a reactance circuit 5 constituted by the four-terminal network surrounded by dotted lines. The four-terminal network is connected by means of its terminals 6 and 7 to the grid 8 and the cathode 3, respectively, of the tube 1, and by means of its terminals 9 and 10 to the extremities of the resonance circuit 2. The terminals 7 and 10 are directly connected within the four-terminal network 5. At 11 has been shown the real part $Rg$ of the input impedance of the tube. In order to simplify the explanation, according to a preferred embodiment of the invention, a capacitive reactance has been selected as the first parallel reactance 12 of the four-terminal network 5. The second parallel reactance 13 is then also a capacitive one and the two series reactances 14 and 15 are inductances, the absolute value of 15 being much greater than that of 14. This embodiment of the invention has the advantage that the capacitor directly connected to the input terminals of the tube constitutes a shunt for the harmonics of the grid current, reducing their unfavorable effect on the form of the control voltage. The invention covers in particular the arrangements of the generator described in which the absolute value of the capacitive reactance 12 is lower by half than that of the input resistance of the tube.

The four-terminal network 5 allows for the obtaining at terminals 6 and 7 of an alternating voltage shifted in phase by $\pi$ with respect to the voltage at terminals 9 and 10. Let it firstly be assumed that the value of the inductance 15 is sufficiently high for the current J entering at 9 into the four-terminal network to depend exclusively on this inductance. This current will thus be delayed by $\pi/2$ in relation to the voltage at the terminals 9 and 10. If now the same absolute value is chosen for the capacitive reactance 13 and the inductive reactance 14 a voltage delayed by $\pi/2$ in relation to the current J is obtained at terminals 6 and 7. The control voltage is thus delayed by $\pi$ in relation to the anode voltage, independently of the values of $Rg$ and of the capacitive reactance 12. In fact, for any finite value of the inductance 15 the phase shift of J is less than $\pi/2$, but by removing the values of reactances 13 and 14 from their resonance values, a delay higher than $\pi/2$ is obtained in the voltage at the terminals 6 and 7 in relation to the current J in such a way that the control voltage is shifted by $\pi$ in relation to the anode voltage.

This required difference in phase may be obtained for any control voltage amplitude lower than the anode alternating voltage by acting upon the values of the reactances 13, 14 and 15, in particular of the second series reactance 15 and of the second parallel reactance 13. The reactance 15 almost exclusively determines the amplitude, and the reactance 13 almost exclusively the phase of the control voltage, whilst the value of the first series reactance 14 substantially influences the phase and amplitude. According to a preferred embodiment of the invention the second series reactance and the second parallel reactance are adjustable.

The invention moreover covers a particularly advantageous dimensioning of the relation existing between the values of the first series reactance 14, of the first parallel reactance 12 and of the second parallel reactance 13. If at the operational frequency these three reactances have the same absolute value $Xo$, the part of the four-terminal network constituted by these reactances is an impedance inverter circuit known also as a "Boucherot circuit." At the location of the second parallel reactance 13 there will then appear, in series with the reactance 15 a purely real impendance 16 having the value $Xo/Rg$ and the phase of the voltage on this impedance 16 is advanced by $\pi/2$ in relation to the control voltage at the terminals 6 and 7, whatever the value of $Rg$. For a practically infinite value of the series reactance 15, a phase shift of $\pi$ is thus obtained between the anode voltage and the control voltage, independently of the state of the load on the tube. If the reactance 15 has a finite value, but still large in relation to the apparent resistance 16, the same favorable effect is nonetheless obtained by diverging slightly from the ideal dimensioning of the Boucherot circuit. The invention covers a range of ratios between the first parallel reactance, the first series reactance and the second parallel reactance, characterised in that for the resonance frequency of the output circuit, or for one of its resonance frequencies, none of the three reactances diverges in absolute value by more than the factor 2 from each of the two others. Experience has shown that within the range thus defined one obtains on the one hand a control amplitude substantially independent of the load of the generator, and on the other hand a phase shift of $\pi$ for those values of the reactance 15 which may be practically used.

In all the rules of dimensioning the four-terminal network forming part of the generator according to the invention it is understood that the predetermined values for the first parallel reactance are those resulting from placing in parallel the input reactance of the tube and any external element. Within the range of high frequencies, the input capacity of the tube sometimes has a value such that no external reactance is necessary. There are even cases where the input capacity of the tube must be placed in parallel with an external inductor in order to provide a reactance of suitable value for the setting up of the four-terminal network.

The reasons stated above are very similar in the case where the generation is a cathode drive arrangement as shown in FIG. 2. In this figure the elements identical to those of FIG. 1 have the same reference numerals, while the elements which carry out a similar function but have a different size or location are given numerals provided with the suffix $a$.

As a difference from the grid drive arrangement of FIG. 1, in the cathode drive arrangement of FIG. 2, the grid electrode 8 is connected to the terminal 7 of the four-terminal network, which terminal is directly connected to the terminal 10 at the opposite side of the four-terminal network. On the other hand, the method of connecting the terminals 9 and 10 to the resonance circuit 2 is the same as in the grid drive arrangement. The polarity of the control voltage would thus not be that which is desired if the constitution of the four-terminal network were that of FIG. 1. In order that the polarity of the control voltage be correct, the second reactance 15a of the four-terminal network 5a is of the sign opposed to that of the reactance 15 of the four-terminal network 5, that is to say, in the preferred arrangement of the invention comprising a capacitive reactance as a first parallel reactance, the reactance 15a is a capacitive one. Under these conditions the voltage on the apparent inductor 16a increases by an angle slightly smaller than $\pi/2$ in relation to the voltage at the terminals 9 and 10. This phase shift must be reduced to zero by a delay obtained in the remainder of the four-terminal network. The reactances 12a, 13a, 14a must therefore be dimensioned so as to give a phase shift smaller than $\pi/2$, this dimensioning being as easy to effect as that of the reactances 12, 13, 14 of the four-terminal network 5 where the desired phase shift was greater than $\pi/2$. In the same way, just like the reactances 12, 13 and 14, the reactances 12a, 13a, 14a may form a Boucherot circuit causing the amplitude of the control voltage to be independent of the input resistance of the tube.

According to a variation of the invention, as illustrated by FIGS. 3 and 4, the four-terminal network effecting the reaction comprises between the two series reactances, a transformer 17 lowering the voltage on the side of the first series reactance. The second parallel reactance 13 may then, either be located entirely on one of the sides of the transformer as shown in FIG. 3, or divided into two parts, 13c and 13d located respectively on the two sides of the transformer as shown by FIG. 4. It will be appreciated that in order to fulfill the same functions, a reactance or part of a reactance located on the side of the highest voltage must have a value multiplied by the square of the transformation ratio of the transformer with respect to a reactance located on the side of the lower voltage. It should also be observed that the parasitic inductances and capacities of the transformer 17 must be taken into consideration when calculating the dimensions of the elements of the four-terminal network, in particular when calculating the dimensions of the reactances 15, 13, 13c, 13d. The variation of the invention which has just been described has several advantageous possibilities for the construction of the generator.

(1) It allows for the reduction of the current passing through the second series reactances, and consequently the reactive power which substantially determines the cost of this component.

(2) It already ensures the separation of the D.C. anode and grid voltages, thus at least partially replacing the blocking condenser. In the case where the second series reactance 15 is an inductance, the latter may be directly used as a choke.

(3) It allows the second series reactance to be constituted, as desired, either by an inductor or by a capacitor both in grid drive and cathode drive arrangements by selecting in a suitable manner the winding direction of the transformer coils and the method of their connection with adjacent members in the four-terminal network. FIG. 5 shows, for example, a four-terminal network which may replace the four-terminal network 5 of FIG. 1. The inductor 15 is replaced by a capacitor 15c. The crossing-over of the connecting conductors of one of the transformer windings indicates a method of connection in which voltages of opposite polarity exist at the respective extremities 34 and 35 of the reactances 14 and 15c. The capacitor 13 of FIG. 1 is moreover replaced by a capacitor 13e located on the side of the highest voltage of the transformer.

As regards the anode circuit of the generator, the invention is not limited to a particular type of resonance circuit. It does, however, cover a particular generator using the reaction circuit described above in any of its embodiments, the output resonance circuit of which is constituted by an assembly of over-coupled circuits. French Patent No. 1,296,598 describes a generator having a great flexibility of matching in the case of variable loads due to the use of a special output circuit composed of two over-coupled circuits, one of which contains the load resistor. This generator is provided with a non-selective feedback circuit and is liable to oscillate in a manner which it is difficult to foresee on one of its two resonance frequencies. This phenomenon, while not comprising the correct operation of the generator, causes difficulty in its use. In the case of a generator with over-coupled anode circuits according to the present invention, the excitation only takes place at a single frequency due to the selectivity of the feedback circuit described above, since the latter is constituted as a filter. To this advantage is added the further advantage of increase in anode efficiency due to the possibility of obtaining a correct prase of the control voltage of the tube.

FIGS. 6 and 7 show complete circuit diagrams of generators according to the invention. The generator of FIG. 6 contains the reaction circuit of FIG. 5, wherein the parallel reactances 12 and 13c are capacitive ones. The first series reactance 14 is an inductive one and the second reactance 15c is a capacitive one. A transformer 17 is inserted between the first series reactance and the second parallel reactance. A voltage source 18 supplies the cathode filament 3 of the tube 1 and a high voltage source 19 provides direct current through the anode 4 via a choke coil 20. The bias voltage of the grid 8 is obtained by means of a grid resistor 21 shunted by a capacitor 22. The anode resonance circuit is constituted by a capacitor 24 and an inductance 25. The output load, normally a member to be heated by means of Foucault currents, is shown in the form of a resistor 26 located in series with the inductance 25. A blocking condenser 27 isolates the resonance circuit as far as direct current is concerned.

The generator in FIG. 7 differs essentially from that in FIG. 6 by a particular constitution of the reaction circuit and of the output resonance circuit. In the reaction circuit, constituted according to FIG. 3, the second series reactance 15 acts also as choke. The output circuit 28 is of the type described in the French patent mentioned above. A resonance circuit constituted by the inductance 29, the capacitor 30 and the resistor 31 coming from a useful load, is inserted in series in another circuit comprising an inductance 32 and a capacitor 33. The circuit 28 thus comprises two over-coupled circuits and possesses two resonance frequencies. Due to the selectivity of the reaction circuit it is possible to select one of these frequencies as the operational frequency.

It will be understood that each of the elements described above, or two or more together, may also find a useful application in other types of alternating voltage generator arrangements including a four-terminal network.

While the invention has been illustrated and described as embodied in alternating voltage generator arrangements including a four-terminal network and including a plurality of parallel and series resistance means, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. An alternating current generator arrangement comprising, in combination, an electronic amplifier tube having a predetermined input resistance and reactance, a control grid, and input and output terminals; resonant circuit means having a pair of connecting terminals connected to the output terminals of said tube; and feedback circuit means connected between said input terminals of said tube and said connecting terminals of said resonant circuit means for rendering said arrangement self-oscillating, said feedback circuit means being a four-terminal network comprising a first and a second terminal connected to said input terminals of said tube; a third and a fourth terminal connected to said connecting terminals of said resonant circuit means; a first inductor means and a second inductor means connected in series between said first and third terminal and having a junction connecting said first inductor to said second inductor, said first inductor being also connected to said first terminal; a first capacitor means connected between said first and second terminals; and a second capacitor means connected between said junction and said second and fourth terminals, the absolute magnitude of the reactance of each of said first and second capacitor means and first inductor means differing from each other by not more than a factor of 2, the absolute magnitude of the reactance of said second inductor means exceeding substantially that of said first inductor means.

2. A generator arrangement according to claim 1, wherein each of said second capacitor parallel reactance means and said second series reactance inductor means is adjustable.

3. A generator arrangement according to claim 1, wherein said resonant circuit means comprises an assembly of two overcoupled resonant circuits.

4. An alternating current generator arrangement as defined in claim 1 including a transformer means having a primary winding connected to said second inductor means and to said fourth terminal, and a secondary winding connected to said first inductor means and to said second terminal, said second capacitor means being connected in parallel with one of said windings.

5. A generator arrangement according to claim 4, wherein said resonant circuit means comprises an assembly of two overcoupled resonant circuits.

6. An alternating current generator arrangement as defined in claim 4 wherein said second capacitor means comprises a first capacitor portion and a second capacitor portion independent of said first portion and disconnected therefrom, said first capacitor portion being connected in parallel with said primary winding and said second capacitor portion being connected in parallel with said secondary winding.

7. A generator arrangement according to claim 6, wherein said resonant circuit means comprises an assembly of two overcoupled resonant circuits.

8. A generator arrangement according to claim 4, wherein each of said second capacitor parallel reactance means and said second series reactance inductor means is adjustable.

9. A generator arrangement according to claim 8, wherein said resonant circuit means comprises an assembly of two overcoupled resonant circuits.

10. An alternating current generator arrangement as defined in claim 4 wherein said secondary winding has a smaller number of turns than said primary winding.

11. A generator arrangement according to claim 10, wherein each of said second capacitor parallel reactance means and said second series reactance inductor means is adjustable.

12. A generator arrangement according to claim 11, wherein said resonant circuit means comprises an assembly of two overcoupled resonant circuits.

13. A generator arrangement according to claim 10, wherein said resonant circuit means comprises an assembly of two overcoupled resonant circuits.

No references cited.

ROY LAKE, *Primary Examiner.*

J. B. MULLINS, N. KAUFMAN, *Assistant Examiners.*